(12) United States Patent
Haddad et al.

(10) Patent No.: US 8,156,027 B1
(45) Date of Patent: Apr. 10, 2012

(54) FAIR-VALUE PRICING OF A FINANCIAL ASSET

(75) Inventors: Robert N. Haddad, Acton, MA (US);
Peter L. Ciampi, Lexington, MA (US);
Eric Zitzewitz, Cambridge, MA (US)

(73) Assignee: Interactive Data Pricing and Reference Data, Inc., Bedford, MA (US)

( * ) Notice: Subject to any disclaimer, the term of this patent is extended or adjusted under 35 U.S.C. 154(b) by 0 days.

(21) Appl. No.: 12/980,004

(22) Filed: Dec. 28, 2010

Related U.S. Application Data

(63) Continuation-in-part of application No. 11/605,031, filed on Nov. 27, 2006, now Pat. No. 7,860,770, which is a continuation of application No. 09/835,605, filed on Apr. 16, 2001, now Pat. No. 7,167,837.

(51) Int. Cl.
*G06Q 40/00* (2012.01)
(52) U.S. Cl. .............. 705/35; 705/36 R; 705/37; 705/38
(58) Field of Classification Search .................... 705/35, 705/36 R, 37, 38
See application file for complete search history.

(56) References Cited

U.S. PATENT DOCUMENTS 6,832,211 B1 * 12/2004 Thomas et al. ............. 705/36 R

* cited by examiner

*Primary Examiner* — Daniel Felten
(74) *Attorney, Agent, or Firm* — Cowan, Liebowitz & Latman; Steven D. Underwood (57) ABSTRACT

An exemplary embodiment comprises a method for determining at an effective valuation time a fair value of an exchange traded fund comprising securities, at least one of the securities not currently trading in a liquid market, comprising: (a) for each security: (i) receiving historical price data, wherein the historical price data comprises data for price-related time-dependent variables; (ii) performing a regression analysis on the historical price data; and (iii) calculating at the effective valuation time a fair value of the security based on the regression analysis and on values of one or more of the plurality of price-related time-dependent variables; (b) multiplying the fair value by the security's weighting in the exchange traded fund to obtain a weighted fair value; and (c) aggregating the weighted fair values of the plurality of securities in the exchange traded fund to obtain a fair value adjusted price for the exchange traded fund.

17 Claims, 3 Drawing Sheets

```
┌─────────────────────────────────────────────────────────────┐
│ Determine a first amount by multiplying a first coefficient by a │
│ difference between the most recent closing price of the asset and │
│ the most recent price of a depository receipt.             │
│                            202                              │
└─────────────────────────────────────────────────────────────┘
                              │
┌─────────────────────────────────────────────────────────────┐
│ Determine a second amount by multiplying a second coefficient │
│ by a difference between the most recent closing price of the asset │
│ and the second most recent closing price of the asset.      │
│                            204                              │
└─────────────────────────────────────────────────────────────┘
                              │
┌─────────────────────────────────────────────────────────────┐
│ Determine a third amount by multiplying a third coefficient by a │
│ difference between the most recent closing price of the    │
│ depository receipt and the second most recent closing price of │
│ the depository receipt.                                     │
│                            206                              │
└─────────────────────────────────────────────────────────────┘
                              │
┌─────────────────────────────────────────────────────────────┐
│ Determine a fourth amount by multiplying a fourth coefficient │
│ by a rate of change of an index price.                     │
│                            208                              │
└─────────────────────────────────────────────────────────────┘
                              │
┌─────────────────────────────────────────────────────────────┐
│ Determine a fair value price for the asset by summing the  │
│ amounts.                   210                              │
└─────────────────────────────────────────────────────────────┘
```

FAIR-VALUE PRICING OF A FINANCIAL ASSET

CROSS REFERENCE TO RELATED APPLICATIONS

This application is a continuation-in-part of U.S. patent application Ser. No. 11/605,031, filed on Nov. 27, 2006 now U.S. Pat. No. 7,860,770, which is a continuation of U.S. patent application Ser. No. 09/835,605, filed on Apr. 16, 2001 U.S. Pat. No. 7,167,837. The entire contents of each of those applications are incorporated herein by reference.

BACKGROUND

An investor who wishes to put funds into a mutual fund, that is buy shares of the mutual fund, typically pays the share price as of the end of the trading day for the mutual fund. Similarly, when an investor wishes to redeem funds, that is sell shares in the mutual fund, the share price is typically determined at the end of the trading day. Since the closing price is the price at which the transactions occur, determining the share price of the mutual fund at the close of the trading day is of great importance.

U.S.-based mutual funds with underlying assets that are traded on foreign exchanges typically use the closing prices of the foreign assets on the foreign exchange to determine the share price of the mutual fund. U.S.-based mutual funds typically determine the price of the fund at 4:00 PM Eastern time. Since the trading of the underlying assets of such a mutual funds close at different times than the mutual fund, the closing price for the foreign asset may not accurately reflect the value of the underlying assets of the mutual fund at 4:00 PM Eastern time. This may result in the mutual fund being under-valued or over-valued. The closing price of an asset is said to be "stale" when it no longer reflects the current value of the asset. The problem of using stale prices for underlying assets is more pronounced in volatile markets.

Arbitrageurs often take advantage of mutual funds that use stale pricing at the expense of other investors in the mutual funds. Arbitrageurs will buy shares of funds when the fund is undervalued and sell the shares when the fund is overvalued. Some U.S.-based mutual funds with underlying assets that are traded on foreign exchanges have attempted to limit such dilution by imposing higher short term trading fees, limiting the number of trades in a period of time, and blocking execution of some trades. These measures prevent only some of the dilution.

Stale prices may occur in other situations. Mutual funds may include assets that are normally traded during the same hours as the mutual fund but for some reason are not traded during a portion of a particular day. For example, thinly traded U.S. securities may have large periods of time when no shares are traded. The last trade of the day for such a stock could be an hour or more before the price of the mutual fund is determined. A stock may not trade for other reasons including: the trading in a stock may be halted for one of many reasons, including, the trading range maximum has been reached; a natural disaster may close an exchange; the trading in a stock may be halted for only individual investors, while other investors can continue to trade; or a stock exchange may be closed for a holiday.

SUMMARY

The fair value of a fund is determined by analyzing various security market factors that contain information about how the underlying assets of the fund would be valued in a liquid market. The fund may be an international mutual fund whose underlying assets include international equities. Because some of the underlying assets may not be traded in a liquid market at the time of valuation of the fund, a reliable estimate of the value of such underlying assets must be made based on available data related through historical correlations. The estimation of the value of such assets provides an alternative to using stale prices for such assets and thus overvaluing or undervaluing the fund. The underlying assets that are traded in a liquid market at the time of valuation of the fund may be valued using the current trading price of the assets. The fair value of the fund is the value of its net assets, with the values of these assets determined using either their actual or fair values.

The foregoing discussion has been provided only by way of introduction. Nothing in this section should be taken as a limitation on the following claims, which define the scope of the invention.

BRIEF DESCRIPTION OF SEVERAL VIEWS OF THE DRAWINGS

The present invention is illustrated by way of example in the accompanying figures. In the figures, like reference numbers indicate identical or functionally similar elements. Additionally, the left-most digit(s) of a reference number identifies the figure in which the reference number first appears.

DETAILED DESCRIPTION

I. Introduction

An improved valuation method and system is disclosed that provides a significantly more accurate method of valuation of mutual funds and other financial instruments that include underlying asset(s) that are not being traded in a liquid market when the valuation is performed. The improved valuation greatly reduces the opportunities for arbitrageurs to take advantage of over-valued or under-valued mutual funds. Thus, the dilution caused by the arbitrageurs at the expense of the long-term investors is greatly reduced or eliminated. The fair value determination allows the fund, such as an open-ended mutual fund, to be traded a price closer to the fund's true value. The fair value of the fund is determined by combining the fair value of each of the underlying assets.

The fair value price of an underlying asset that is not currently trading in a liquid market may be a function of historical price relationships between the asset and other financial prices. The fair value price is the price that would prevail in the most liquid market. Various financial assets that may be valued using this fair value methodology, include, but are not limited to: international equities, international bonds, domestic small-cap equities, domestic corporate bonds, municipal high-yield bonds, mutual funds that contain such assets, and other financial assets.

Determining a fair value of a fund by determining the fair value of each of the underlying assets provides several advantages over other techniques, such as using historical data to adjust the net asset value ("NAV") of a fund directly. While a similar valuation method, including similar regression and correlation techniques, could be applied at the fund level instead of at the underlying asset level to determine the NAV of the fund, such techniques have important shortcomings.

Relatively new funds lack enough historical data to perform a proper regression analysis, even when sufficient data exists for the underlying assets. Many funds change their underlying assets and the amount of each of the underlying assets over time. Any fund level valuation that includes fund level NAV data, before the mix of underlying assets changed, is of limited relevance and may produce questionable results. Because the NAV of funds are reported rounded to the nearest penny, a fund level valuation will have a rounding error. For example, the rounding error may be approximately 5 to 10 basis points for a fund with a NAV of $10. In contrast, in a valuation at the underlying asset level the rounding error will tend to converge to zero because the fund includes a large number of underlying assets, also called securities, and a large number of historical data points are used.

A fund may not have as high of a correlation with industry indices and geographic indices because the fund is more diverse then each underlying asset. For example, a fund may include underlying assets that are from several industry sectors and numerous countries. Some of the underlying assets may have a high correlation with an industry index and a geographic index and other underlying assets may have a high correlation with a different industry index and a different geographic index. The fund may not have a statistically significant correlation with either of the industry indices or the different geographic indices. Similarly, a depositary receipt may have a high correlation with an underlying asset and little correlation with the fund.

II. Definitions

American Depositary Receipt ("ADR")—A depositary receipt that represents shares of stock in an overseas corporation and is traded on an American exchange. A certificate issued by a U.S. depository bank, representing foreign shares held by the bank, usually by a branch or correspondent in the country of issue. One ADR may represent a portion of a foreign share, one share, or a bundle of shares of a foreign corporation. If the ADR's are "sponsored," the corporation provides financial information and other assistance to the bank and may subsidize the administration of the ADR.

Depositary Receipt ("DR")—a negotiable certificate that represents shares of a foreign company, fund or debt that is traded on a domestic stock market.

European Depositary Receipt ("EuroDR")—A depositary receipt that includes European assets.

Fair value—The price a financial asset would trade at in a liquid market.

Global Depositary Receipt ("GDR")—A depositary receipt similar to an ADR.

Holding Company Depositary Receipt ("HOLDRS")—A depositary receipt that represents ownership in a specified group of stocks and often focuses on a specific business sector.

Linear regression—A model describing the variation of a certain response variable as a linear combination of the effects of a set of predictors and a random error term.

Mutual fund—A pools of money that are managed by an investment company. Mutual funds offer investors a variety of goals, depending on the mutual fund and its investment charter. Some mutual funds seek to generate income on a regular basis. Other mutual funds seek to preserve an investor's money or seek to invest in companies that are growing at a rapid pace. Mutual funds can impose a sales charge, or load, on investors when they buy or sell shares. No-load mutual funds impose no sales charge.

Net Asset Value ("NAV")—The value of a mutual fund computed from the value of the value of the mutual fund's underlying assets.

NASDAQ—The National Association of Securities Dealers Automatic Quotation.

NYSE—The New York Stock Exchange.

"P-value"—A quantity calculated from sample data that indicates the probability of a getting a value of the test statistic at least as extreme as the value observed, if the null hypothesis H0, is true. A P-value is the smallest level of significance for which the statistic indicates the rejection of the null hypothesis. For example, the P-value that is typically calculated for a regression coefficient is the probability of obtaining the observed coefficient or a more extreme value if the true value of the coefficient were zero. P is computed from a given statistic such as a z-score, and if p is less than the level of significance, the null hypothesis is rejected. If p were greater than the level of significance you would fail to reject the null hypothesis.

R-squared (the "coefficient of determination")—A number that represents how well a line of best fit describes a relationship between two or more variables. The line of best fit may be a least squares line. The R-squared value is a number from 0 and +1. An R-squared value of zero implies that the line does not describe the relationship. An R-squared value of +1 indicates that the data values fall directly on the line of best fit and hence the line is a good description of the relationship between these two variables.

Standard & Poor's Depositary Receipt ("SPDR")—A depositary receipt that tracks the S&P 500 and trade on the American Stock Exchange under the symbol SPY.

Test statistic ("t-stat")—A quantity calculated from sample data that is used to decide whether or not the null hypothesis should be rejected. A large t-stat indicates rejecting the null hypothesis.

ISHARE—One of the 17 single-country index funds that are exchange-traded funds and track markets including Australia, Belgium, Hong Kong, and the United Kingdom.

III. Method of Determining a Fair Value

Figure 1:
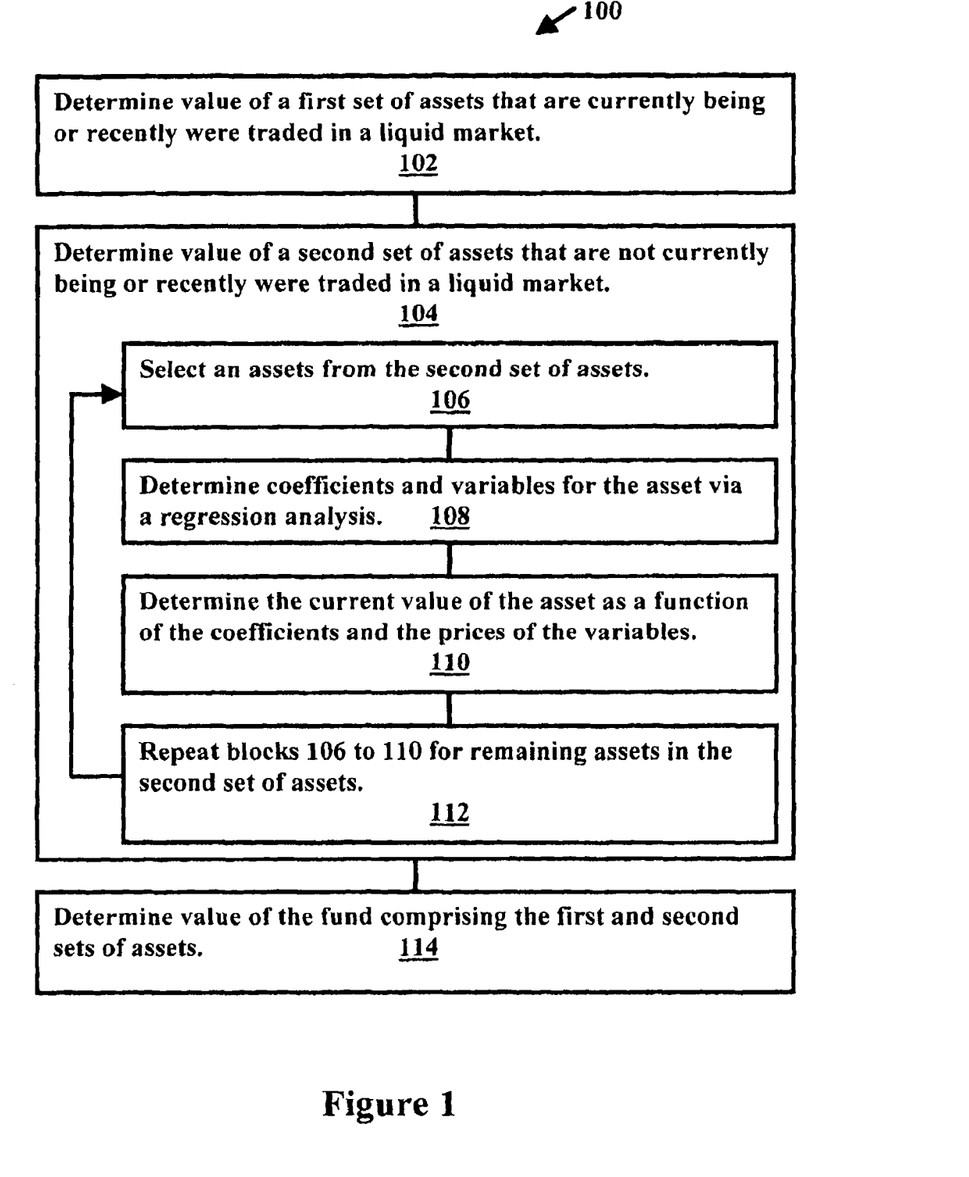
FIG. 1 illustrates a flow diagram of a method of determining a fair-value of a fund having underlying assets.

FIG. 1 illustrates a flow diagram of a method 100 of determining a fair value of a mutual fund that includes a first set of assets that are currently being or recently were traded in a liquid market and a second set of assets that are not currently being traded or recently were traded in a liquid market. The fund may be a mutual fund with underlying assets that include international equities or other assets that are not traded at the time when the fund is valued.

In block 102, the value of a first set of mutual fund assets is determined. The first set of assets may include assets that are traded in a liquid market on or about the time of the valuation. For example, if the mutual fund is a U.S.-based mutual fund that focuses on technology stocks, the domestic stocks, such as Cisco Systems, Inc. and Lucent Technologies, Inc., are most likely traded in a liquid market during or near the time of valuation. Such domestic stocks may be traded on the New York Stock Exchange ("NYSE"), the NASDAQ, or other exchanges. The mutual fund may be valued shortly after 4:00 PM Eastern time. The value of some of the assets in the first set of assets, for example, currencies, bonds, cash, and other financial instruments, may be established by means other than a stock exchange. If the mutual fund includes only international assets, the first set of assets may include no assets.

In block 104, the value of a second set of assets of the mutual fund is determined. The second set of assets may be traded during different hours of the day than the mutual fund. For example, the assets in the second set of assets may include foreign equities traded on stock exchanges, such as the Tokyo Stock Exchange, the Singapore Stock Exchange, the Australian Stock Exchange, or the London Stock Exchange. The value of a second set of assets of the mutual fund may be determined via the method of blocks 106-110. While blocks 106-110 illustrate a method of determining the value of the second set of assets, other methods are also possible. For example, the coefficients and the variables may be determined for each of the assets before the current values for the assets are determined.

In block 106, an asset to be valued is selected from the second set of assets.

In block 108, a regression analysis of the asset selected in block 106 is performed to determine the variables and the coefficients for those variables. The variable may be only those variable that are statistically significant or that increase the R-squared value. A variable may be determined to be statistically significant at various levels such as for 0.1% to 10%, and preferably the 5% level. Each asset in the second set of assets may have different variables that are statistically significant to that asset's price. The variables may include recent changes in the value DRs, currency prices, industry indices, country indices, futures, interest rates, and other financial assets or indicators.

The fair value price may be determined using a regression technique that includes historical data on a rolling basis. The time-frame for the regression may be any period, such as, several months to ten years, or more. Various adjustments may be made to the historical data to compensate for various effects. For example, some of the related assets, such as, holding company depositary receipts are included in the estimation for only those days when their volume exceeds a predetermined level, such as 100,000 shares. Prices are eliminated from days where the related assets not traded or were only thinly traded to reduce the possibility of using uncharacteristic prices. Other adjustments may also be made.

The fair value of some assets may be determined using a first regression period and the fair value of other assets may be determined using a second regression period. Within the regression period, more recent data may be weighted more heavily than older data. Such weighting attempts to account for changes in the models parameters. The weighting may include geometric weighting.

Various regression techniques may be used to determine the fair value of the asset, such as multivariate linear regression, a polynomial regression, or other technique. The variables used in the regression may vary between assets and over time. The regression technique may include a multi-factor econometric regression analysis that uses historical pricing relationships between the fair value of an asset and the related assets. A related asset may include a stock, a bond, a market index, sector index, geographic index, a futures contract, a depositary receipt, a currency rate and/or other financial data.

For example, the regression may include a linear regression such as:

$$P_{t+1}-P_{t-1}=a+b^*(X_t-X_{t-1})+c^*(Y_t-Y_{t-2})+e \qquad \text{Eqn. 1}$$

Where:

P is a one dimensional table containing the historical prices for the asset whose fair-value is being estimated.

X is a vector of prices for a set of related assets. X may represent a 2 dimensional matrix where a first dimension is assets such as ADR, general index 1, general index 2, sector index 1, sector index 2, future 1, future 2, and a second dimension is the historical prices for these assets. The prices may be expressed in logarithms.

Y is also a 2-dimensional matrix similar to X but includes those assets which trade at t−2 relative to t and t−1. The prices may be expressed in logarithms.

a, b, and c are coefficients or vectors of coefficients. "e" is an error term.

Time "t" is the time of the fair value determination.

Time "t+1" is the time at which the asset will normally next trade in a liquid market.

Time "t−1" is the time at which the asset in vector X last traded in a liquid market.

Time "t−2" is the time at which asset in vector Y last traded.

The increments between time "t−2", time "t−1", time "t", and time "t+1" need not be equal increments. For example, if the fair value of a French equity is determined at 4:00 PM Eastern time, then time "t−2" may be the prior-day market close; time "t+1" may be the following-day market open or close in France, time "t" may be 4 PM Eastern time; time "t−1" may be the current-day market close in France (11:30 AM Eastern time).

The vector X may include the prices of assets that include the S&P 500 futures prices, the NASDAQ 100 futures prices, and/or prices of other futures contracts. Many futures contracts, including the S&P 500 and the NASDAQ 100, are traded 24-hours-a-day. Such related assets have prices available at both time "t" (e.g., 4:00 PM) and time "t−1" (e.g., 2:00 AM). The vector Y may include the prices of a U.S. equity in the same industry as the asset being valued, where that asset does not trade at time "t−1." The traded price for the asset in vector Y are known for times "t" and "t−2." The related assets that are included in the vectors X and Y may be different for determining the fair value of different assets and may change over time. The related assets included in the vectors X and Y are selected to achieve the best model performance. The best model performance may be defined as the model with the highest adjusted-R squared value (coefficient of determination). While many or all of the coefficients may be statistically significant in predicting the value of the asset, some coefficients may increase the adjusted-R squared value yet not be statistically significant. Such coefficient may be used in the predicting formula. An adjusted R squared value of 0.4 would predict 40% of the variance between today's price and the predicted price for tomorrow.

When the regression data is weighted using a geometric weighting function, the weight "ws" for observation "s" for a model estimated at time "t" may be determined using Equation 2. The variable "d" may be any value. When "d" is equal to 0.002, the data is down weighted by one-half for each year it is old.

$$ws=EXP(-d(t-s)) \qquad \text{Eqn. 2}$$

A stepwise-regression method is used to determine which of the specific market indices and other related assets build the best regression equation as described in Draper, N. R. and Smith, H. "Applied Regression Analysis" 335-338 (Wiley 3rd ed. 1998), which is incorporated herein by reference. Only the variables that contribute the most statistically significant predictive power to the fair-value calculation are used. For example, the related assets may include sector indices and depositary receipts listed in Table 1.

TABLE 1

Example of sector indices and depositary receipts

| Sector | Index Sponsors | | | | | | |
|---|---|---|---|---|---|---|---|
| | S&P | Nasdaq | Amer-Exch | Philadelphia | MSDW | Pacific | HOLDRS |
| Bank | BIX | BANK | | BKX | | | RKH |
| Financial Brokers/Dealers | | | XBD | | | | |
| Insurance | IUX | INSR | | | | | |
| Bio Tech | | | BTK | | | | BBH |
| Pharmaceuticals | | | DRG | | | | PPH |
| Health Care | HCX | | | | | | |
| Technology | | | XCI | | | PSE | |
| Semi-Conductor | | | | SOX | | | SMH |
| Networking | | | NWX | | | | |
| Tele Comm. | | IXTC | PHN | | | | TTH |
| Computer - Hardware | | IXCO | | | | | |
| Retail | RLX | | | | | | |
| Consumer | | | | | CMR | | |
| Cyclic | | | | | CYC | | |
| Airlines | | | XAL | | | | |
| Forest and Paper | | | | FPP | | | |
| Tobacco | | | | | | TOB | |
| REIT | | | | | | RMP | |
| Chemicals | CEX | | | | | | |
| Energy | | | DXE | | | EXV | |
| Utility | | | | | UTY | | UTH |
| Oil | | | XOI | | | | |

After selecting the variables using historical data, the current day's parameter values are inserted into Equation 1 and the predicted price difference, $P_{t+1}-P_{t-1}$, is calculated. This predicted value is then added to the most recent market price to generate the fair-value price. The prices may be represented in logarithmic form. The predicted price difference, $P_{t+1}-P_{t-1}$, can be viewed as an adjustment to the last closing price that reflects the changes in the price of assets in the vectors X and Y.

In block 110, the current value of the asset is determined as a function of the coefficients and the prices of the variables. The current value of the variables may be multiplied by the coefficients. The variables may include one to 50, or more variables.

In block 112, blocks 106 to 110 may be repeated for each of the remaining assets in the second set of assets.

In block 114, the fair value price of the mutual fund is determined. The fair value price comprises the value of the first and second sets of assets.

Figure 2:
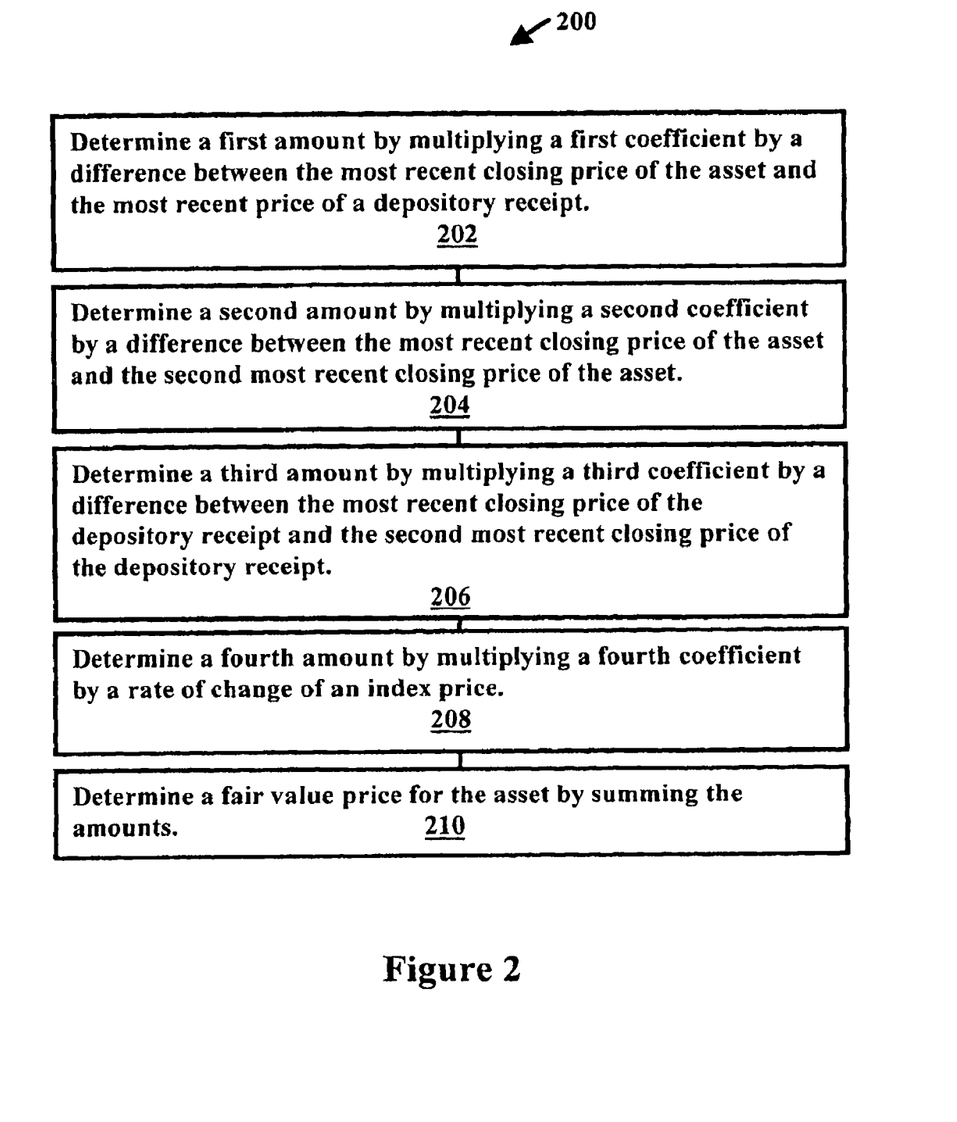
FIG. 2 illustrates a flow diagram of a method of determining a fair-value of an underlying asset.

FIG. 2 illustrates a flow diagram of an example of a method 200 of determining a fair value of an asset that is not currently being traded in a liquid market.

In block 202, a first amount is determined by multiplying a first coefficient and a difference between the most recent closing price of an asset and the most recent closing price of a depositary receipt ("DR") price. The DR may be an American Depositary Receipt for the asset being valued.

In block 204, a second amount is determined by multiplying a second coefficient and a difference between the most recent closing price of the asset and the second most recent closing price of the asset.

In block 206, a third amount is determined by multiplying a third coefficient and a difference between a most recent closing price of a DR and a second most recent closing price of the DR.

In block 208, a fourth amount is determined by multiplying a fourth coefficient and a rate of change of an index. Block 208 may also include multiplying other coefficients and other indices as illustrated in Equation 3.

In block 210, a fair value price difference for the asset is determined as a function of the amounts from blocks 202-208. The fair value of the asset may be determined by adding the fair value price difference to the most recent closing price. Equation 3 illustrates an embodiment of the method of FIG. 2.

$$P_{d+1}-P_d = a*(P_{ADR}-P_d) + b*(P_d-P_{d-1}) + c*(P_{ADR}-P_{ADR-1}) + d*(\Delta S\&P) + e*(\Delta ISHARE) + f*(\Delta SECTORS) \quad \text{Eqn. 3}$$

$P_d$ is the price of the asset as of the last trade.

$P_{d-1}$ is the price of the asset as of a time period prior to the last trade.

a, b, c, d, e, and f are the coefficients determined by regression analysis.

$P_{d+1}$ is the price of the asset as of the next time period.

$P_{ADR}$ is the price of the ADR as of the last trade.

$P_{ADR-1}$ is the price of the ADR as of a time period prior to the last trade.

$\Delta S\&P$ is the rate of change of the Standards and Poor's index as of the last trade. The S&P index may be the S&P 500 index $\Delta ISHARE$ is the rate of change of the ISHARE index fund as of the last trade.

$\Delta SECTORS$ is the rate of change of a sector index as of the last trade. A sector index may be any relevant sector specific index or set of sector specific indices. The usefulness of sector indices in understanding the behavior of stocks is described in Robin Brooks and Luis Catao, "The new economy and global stock returns" (International Monetary Fund Working Paper 216) (2000), which is incorporated herein by reference.

Equation 3 determines the change in the price for an asset $(P_{d+1}-P_d)$ between the last traded price $P_d$ and the price the asset will trade for in the future $(P_{d+1})$. After the expected future price, that is the fair value, of each underlying is determined, the fair value of the mutual fund may be determined.

IV. Example of Regression Variables

The multivariate regression may evaluate numerous terms, that is variables, to determine the terms that are the most statistically significance in predicting future prices of an asset. The most relevant terms as determined by the regression analysis for an asset like Sony Corporation may include a technology industry index, a consumer products index, the Sony depository receipt, the iShare price for Japan, and the Nikkei Future price. The regression analysis for an other assets may identify other terms as statistically significant including:

1. a price for a U.S.-traded depositary receipts;
2. a price for a S&P 500 futures contracts;
3. a price for the NASDAQ 100 futures contract;
4. a price for the Russell 2000 index;
5. a price for several of the most relevant industry-specific market indices;
6. a price for several of the most relevant industry-specific depository receipts;
7. a price for several of the most relevant geographic-specific indices;
8. a price for the U.S. dollar to local currency exchange rate;
9. a price for a foreign market future; and
10. the difference between the last closing price and the bid-ask midpoint.

V. Valuation of an Underlying Asset

The following is an illustration of a valuation of an underlying asset of a mutual fund. Fidelity Investment's Telecommunications Sector Fund includes shares of Vodafone Group P.L.C. ("Vodafone"). Vodafone is a British telecommunication company traded on the London Stock Exchange as "VOD."

The result of a multivariate linear regression determined the seven most statistically significant terms, that is the independent variables, and the coefficient for each term for Vodafone. Table 2 summarizes the results of the regression analysis.

TABLE 2

Regression results for Vodafone

| Independent variable | Coefficient | Standard Error | T-Stat | P-value |
|---|---|---|---|---|
| Difference between ADR price at 4 PM and local close in USD | 0.3117 | 0.1065 | 2.9 | 0.004 |
| Change in local close in USD | 0.0366 | 0.0766 | 0.5 | 0.633 |
| Change in ADR price | 0.0906 | 0.0809 | 1.1 | 0.263 |
| Change in USD-GBP exchange rate | 0.2059 | 0.2473 | 0.8 | 0.405 |
| Change in DJIA | 0.1412 | 0.1139 | 1.2 | 0.216 |
| Change in NASDAQ Computer index | 0.1907 | 0.0580 | 3.3 | 0.001 |
| Constant | 0.0003 | 0.0011 | 0.3 | 0.754 |

This regression analysis used data from prior to August 2000 with a sample size of 620 days. The dependent variable is tomorrow's close-to-close change in the local price of Vodafone calculated in U.S. dollars.

Tables 3 and 4 show the actual and predicted price change of Vodafone from August 1 to Aug. 31, 2000. The changes in price are based on the seven terms identified by the results of the regression analysis shown in Table 2, The correlation between the actual and predicted price change is 0.7531. The price changes are the price changes represented in the logarithm of the price, index, or exchange rate. An increase in the "USD–GBP rate" means the dollar appreciated relative to the British pound.

TABLE 3

Predicted price changes for August 2000 - part I.

| Date | Tomorrow's price change Actual | Tomorrow's price change Predicted | Difference between ADR and local close price | Change in local price in USD | Change in ADR price |
|---|---|---|---|---|---|
| Aug. 1, 2000 | −0.0372 | −0.0070 | −0.0054 | −0.0082 | −0.0044 |
| Aug. 2, 2000 | −0.0249 | −0.0136 | −0.0235 | −0.0372 | −0.0554 |
| Aug. 3, 2000 | 0.0573 | 0.0132 | 0.0182 | −0.0249 | 0.0168 |
| Aug. 4, 2000 | −0.0406 | −0.0048 | −0.0286 | 0.0573 | 0.0105 |
| Aug. 7, 2000 | 0.0097 | −0.0037 | −0.0153 | −0.0406 | −0.0273 |
| Aug. 8, 2000 | 0.0039 | 0.0067 | 0.0023 | 0.0097 | 0.0273 |
| Aug. 9, 2000 | −0.0141 | 0.0009 | −0.0001 | 0.0039 | 0.0015 |
| Aug. 10, 2000 | −0.0144 | −0.0099 | −0.0086 | −0.0141 | −0.0227 |
| Aug. 11, 2000 | 0.0235 | 0.0025 | 0.0027 | −0.0144 | −0.0031 |
| Aug. 14, 2000 | 0.0126 | 0.0079 | 0.0005 | 0.0235 | 0.0212 |
| Aug. 15, 2000 | 0.0000 | 0.0002 | −0.0016 | 0.0126 | 0.0105 |
| Aug. 16, 2000 | −0.0399 | −0.0023 | −0.0090 | 0.0000 | −0.0075 |
| Aug. 17, 2000 | −0.0114 | 0.0037 | 0.0082 | −0.0399 | −0.0227 |
| Aug. 18, 2000 | −0.0147 | −0.0019 | −0.0006 | −0.0114 | −0.0201 |
| Aug. 21, 2000 | −0.0164 | −0.0057 | −0.0177 | −0.0147 | −0.0317 |
| Aug. 22, 2000 | −0.0321 | −0.0032 | −0.0126 | −0.0164 | −0.0114 |
| Aug. 23, 2000 | 0.0334 | 0.0022 | 0.0014 | −0.0321 | −0.0181 |
| Aug. 24, 2000 | 0.0163 | 0.0091 | 0.0070 | 0.0334 | 0.0391 |
| Aug. 25, 2000 | −0.0005 | 0.0032 | 0.0050 | 0.0163 | 0.0143 |
| Aug. 28, 2000 | 0.0097 | 0.0070 | 0.0102 | −0.0005 | 0.0047 |
| Aug. 29, 2000 | −0.0047 | 0.0018 | −0.0026 | 0.0097 | −0.0031 |
| Aug. 30, 2000 | 0.0191 | −0.0036 | −0.0089 | −0.0047 | −0.0111 |
| Aug. 31, 2000 | 0.0816 | 0.0148 | 0.0125 | 0.0191 | 0.0405 |

TABLE 4

Predicted price changes for August 2000 - part II.

| Date | Change in USD-GBP exchange rate | Change in the DJIA | Change in NASDAQ computer index |
|---|---|---|---|
| Aug. 1, 2000 | −0.0030 | 0.0080 | −0.0288 |
| Aug. 2, 2000 | 0.0045 | 0.0076 | −0.0119 |
| Aug. 3, 2000 | −0.0015 | 0.0018 | 0.0348 |
| Aug. 4, 2000 | −0.0060 | 0.0057 | 0.0059 |
| Aug. 7, 2000 | −0.0015 | 0.0092 | 0.0192 |
| Aug. 8, 2000 | 0.0030 | 0.0101 | 0.0039 |
| Aug. 9, 2000 | 0.0015 | −0.0065 | 0.0050 |
| Aug. 10, 2000 | 0.0015 | 0.0003 | −0.0277 |
| Aug. 11, 2000 | −0.0030 | 0.0109 | 0.0065 |
| Aug. 14, 2000 | −0.0015 | 0.0134 | 0.0158 |
| Aug. 15, 2000 | 0.0000 | −0.0098 | 0.0018 |
| Aug. 16, 2000 | 0.0045 | −0.0053 | 0.0034 |
| Aug. 17, 2000 | 0.0000 | 0.0043 | 0.0195 |
| Aug. 18, 2000 | 0.0030 | −0.0008 | −0.0019 |
| Aug. 21, 2000 | 0.0015 | 0.0030 | 0.0111 |
| Aug. 22, 2000 | 0.0060 | 0.0053 | 0.0002 |
| Aug. 23, 2000 | 0.0030 | 0.0005 | 0.0190 |
| Aug. 24, 2000 | −0.0015 | 0.0034 | 0.0088 |
| Aug. 25, 2000 | 0.0044 | 0.0009 | −0.0087 |
| Aug. 28, 2000 | 0.0015 | 0.0054 | 0.0104 |
| Aug. 29, 2000 | 0.0088 | −0.0034 | 0.0045 |
| Aug. 30, 2000 | 0.0029 | −0.0100 | 0.0042 |
| Aug. 31, 2000 | 0.0000 | 0.0100 | 0.0251 |

VI. System for Determining Fair Value

Figure 3:
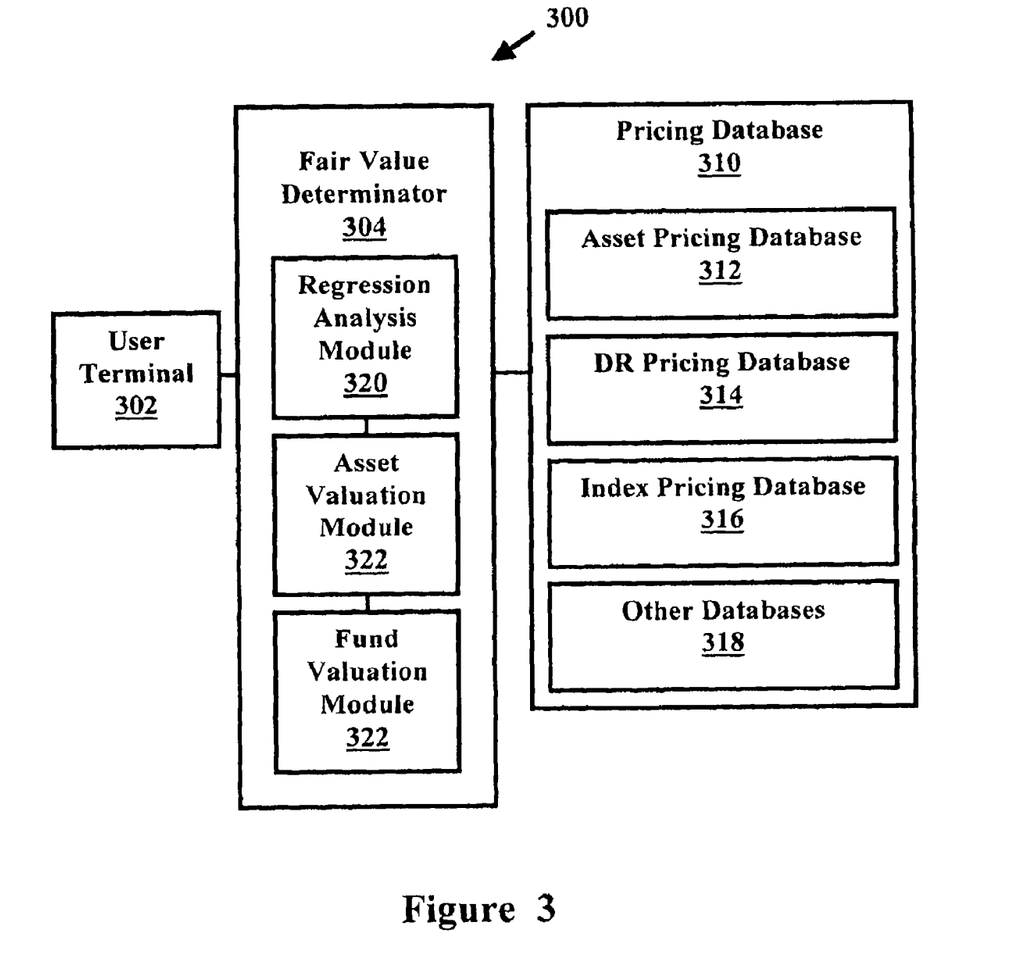
FIG. 3 illustrates a block diagram of a system for determining a fair-value of a fund.

FIG. 3 illustrates a block diagram of a fair-value determination system 300. A user at a user terminal 302 accesses a fair value determinator 304 that determines the fair value for a mutual fund based on the data in the pricing database 310. The pricing database 310 may include such databases as an asset pricing database 312 that includes current prices, up to 10 years of prior days closing prices, and other asset pricing data; a depositary receipt pricing database 314 that may include similar pricing data for various depositary receipts such as ADRs, GDRs, HOLDRs, and EuroDRs; a index pricing database 316; and other databases 318.

The user terminal 302, fair value determinator 304 and pricing database 310 may be integrated into a single computer. Alternatively, the pricing database 310 may include a plurality of different databases located on a variety of computers maintained be various entities. The user terminal 302 may be a personal computer that communicates with the fair value determinator 304 via the Internet. The results of the fair value determinator 304 may be provided to numerous terminals via the Internet or other networks such as a cellular telephone network in substantially real time.

The fair value determinator 304 may include such modules as a regression analysis module 320; an asset valuation module 322, and a fund valuation module 322. The regression analysis module 320 may be a software module that performs multivariate linear regression. The asset valuation module 322 may be a software module that determine a value of the underlying assets of a mutual fund. The underlying assets may include assets that are not currently being traded in a liquid market and other assets that are being traded in a liquid market. The fund valuation module 322 determines the value of the mutual fund. The fund valuation module 322 may determine the price of the mutual fund by using the value of each underlying asset as determined by the asset valuation module 322 and/or by other means.

The fair value determinator 304 may include multiple computers that may be operated by multiple different entities. For example, a first company may operate a computer that includes the regression analysis module 320. The first company may provide the coefficients and the selections of related assets to a second company that operates a computer that includes the asset valuation module 322. The second company's computer could receive the current pricing information for the related assets from the first company, a different company, or may generate the pricing information themselves. The second company's computer uses the coefficients and the current pricing information to generate the valuation of the assets. The second company or a third company may operate a computer that includes fund valuation module 322 uses the valuations of the assets and other data, such as the number of shares of each asset, prices for locally traded asset, valuations of the mutual fund's bonds, and the mutual fund's cash levels, to calculates the fair value of a mutual fund. In such an example, the user terminal 302 is optional.

The first company may receive a request file from the second company. The request file may identify a number of securities that the second company wishes to know the fair value of. For example, the first company may be a financial data provider and the second company may be a mutual fund company. Several of the mutual fund company's mutual funds may include the same asset, for example Sony Corporation. The request file may include only one request for the results of a regression analysis for Sony Corp. The mutual fund company may use the fair value of Sony Corp. to compute the fair value of all their mutual funds that include Sony Corp.

The financial data provider may send the mutual fund company a response file that includes the results of the regression analysis for some or all of the assets identified in the request file. The response file may include the fair value price of the assets, the regression coefficients, and/or other data.

The regression analysis module may determine the regression coefficients before 4:00 PM Eastern time. By determining the regression coefficients before the mutual fund can be valued, the regression coefficients may be transmitted to the mutual fund company earlier. This allows the mutual company more time to review the regression coefficients before the value their mutual funds is determined. Mutual fund companies often wish to have the values of their mutual funds calculated before 4:30 PM or 5:00 PM Eastern time so that the information can be provided to newspapers and other financial tracking and reporting entities for publication.

While preferred embodiments have been shown and described, it will be understood that they are not intended to limit the disclosure, but rather it is intended to cover all modifications and alternative methods and apparatuses falling within the spirit and scope of the invention as defined in the appended claims or their equivalents.

For example, in addition to the aspects described above, other aspects may be such that: (1) the assets falling into the category of "market traded security" include international equity options and international equity index futures contracts, and (2) the valuation frequency description of "effective valuation time" includes a real-time operational procedure. The fundamental concepts and the requirements of fair valuation in the industry continue to be relevant in these cases, with the goal of reflecting a fair price for investors based on current market information and effectively reducing arbitrage potential from market timers trading in mutual funds. A real-time operational procedure improves the information set available to support trading decisions made by investors in an Exchange-Traded Fund (ETF) marketplace.

Exemplary Real-Time Fair Value Information Service for Financial Assets

ETF sponsors are required to publish intra-day indicative valuations (IIVs) every 15 seconds throughout the trading day to provide investors with a real-time estimate of the ETF's value. (Intra-day Indicative Value (IIV) is sometimes referred to as indicative optimized portfolio value (IOPV), intra-day net asset value (iNAV), or an intra-day valuation). For U.S.-listed ETFs comprising U.S. equities, this valuation process is efficient since there are readily available market quotations for both the underlying basket of U.S. equities and shares of the ETF. That is, the IIVs for a U.S.-listed ETF comprising U.S. equities may be determined based upon the current trade prices of the constituent U.S. equities, which are available throughout the same over-lapping time period that the ETF is trading.

Alternatively, for U.S.-listed ETFs comprised of international equities, access to the underlying basket of equities is limited in comparison to access to shares of the ETF during U.S. trading hours. For example, consider a U.S.-listed ETF comprised solely of equities listed on the London Stock Exchange (LSE). The ETF will trade in the U.S. until 4:00 p.m. ET; however, the underlying basket of equities will only trade on the LSE until 11:30 a.m. ET. In this example, when considering the valuation process for determining the IIV every 15 seconds, the IIVs benefit from the availability of trade prices of the underlying equities in the beginning of the U.S. trading day from 9:30 a.m. ET to 11:30 a.m. ET, providing the same efficiency in the calculation as illustrated in the aforementioned example of the IIV calculation for a U.S.-listed ETF comprised of U.S. equities. Following local market close, however, current practice is to calculate the IIV using real-time changes in FX rates to convert local closing prices in local currency to local closing prices in USD. Specifically, this means that the IIVs do not typically reflect how current market activity may impact the value of the underlying basket of equities. (This situation is even more pronounced when considering an international equity ETF comprised of Asian equities, since those markets have closed well ahead of U.S. market open.) The availability of real-time fair valuation of the underlying basket of equities throughout the day (in this example, from 11:30 a.m. ET to 4:00 p.m. ET) could provide an improved benchmark for investors to support trading decisions in the ETF marketplace.

An exemplary embodiment of one aspect of the invention incorporates the modeling procedures described herein to determine beta coefficients for each factor associated to the specific international equity security. These beta coefficients are then used in conjunction with real-time updating movements in the associated factors linked to these beta coefficients to generate real-time fair value adjusted prices. A real-time fair value adjustment is generated for each underlying constituent equity security. Since each security trades individually, and has its own relationship to market activity, each equity security may be adjusted in a manner specific to its historical relationship to its set of factors utilized as part of the methodology described herein. For an exemplary IIV calculation, one may then multiply each constituent's real-time fair value adjusted price by the constituent's weighting in the ETF, and aggregate these joint contributions to generate a real-time fair value adjusted price for the ETF basket.

Example of Real-Time Fair Value Adjustment Calculation

The following example illustrates a real-time fair value process for a hypothetical international equity ETF. In this example, the ETF is comprised of 5 equally-weighted constituent equities within the ETF basket, with each of these underlying equities last trade in their local market at 11:30:00 a.m. ET. In practice, this real-time fair valuation process runs in real-time; however, our illustration simulates the process occurring at precisely 3:45:30 p.m. ET. For illustrative purposes, this example assumes that the FX rate between the local currency and USD from 11:30:00 a.m. and 3:45:30 p.m. has not changed and that there are no cash holdings in the ETF.

TABLE 5

| Constituent Equities (Cn) in International ETF | C1 | C2 | C3 | C4 | C5 |
|---|---|---|---|---|---|
| Constituent Equity Weighting in ETF | 20% | 20% | 20% | 20% | 20% |
| Beta (Factor 1) | 0.10 | 0.17 | 0.25 | −0.22 | 0.81 |
| Beta (Factor 2) | −0.37 | −0.56 | 0.19 | 0.42 | −0.29 |
| Beta (Factor 3) | 0.11 | 0.71 | −0.23 | 0.66 | 0.19 |
| Factor 1 change (11:30:00 to 15:45:30) | 0.55% | 0.55% | 0.55% | 0.55% | 0.55% |
| Factor 2 change (11:30:00 to 15:45:30) | −0.24% | −0.24% | −0.24% | −0.24% | −0.24% |
| Factor 3 change (11:30:00 to 15:45:30) | 1.23% | 1.23% | 1.23% | 1.23% | 1.23% |
| Constituent Equity FVIS Adjustment Factor | 1.003 | 1.011 | 0.998 | 1.006 | 1.008 |
| Weighted FVIS Adjustment Factor for ETF basket | 1.005 | | | | |

TABLE 5-continued

| Constituent Equities (Cn) in International ETF | C1 | C2 | C3 | C4 | C5 |
|---|---|---|---|---|---|
| ETF basket value as of local market close time | $10.00 | | | | |
| Real-Time Fair Value Adjusted ETF basket value (3:45:30 p.m. ET) | $10.05 | | | | |

Fair Value Adjusted Fixed Income Securities

For fixed income securities, an exemplary embodiment first collects the individual bond characteristics (e.g., coupon rate, payment frequency, maturity date, issue features, issuer, etc.) and market data inputs (such as benchmark curves and credit spreads) that were used to determine the evaluations (through, for example, a market conventional discounting cash flow approach, depending upon security type) for the (typically, international) fixed income securities earlier in the day at local market close time.

From here, regression analysis preferably is conducted between movements in market data inputs and a correlative set of factors to determine the relationship between movements, and identify the beta coefficients associated with each factor. Following regression, adjustments are applied to said market data inputs by applying an adjustment factor to the initial input. An adjustment factor preferably is determined by multiplying the factor beta coefficients to the corresponding movements in each factor occurring from local market close time to effective valuation time. Once market data inputs are updated to reflect new market information available at an effective valuation time, the market conventional valuation approach generates a fair value adjusted international bond evaluation.

Exemplary Valuation Procedures: International Fixed Income Securities

Based on individual fixed income security reference data, characteristics, terms and conditions, and market data inputs, an exemplary embodiment:
1. Regresses correlative factors to market data inputs (e.g., benchmark curves, credit spreads, etc.) to determine beta coefficients;
2. Multiplies factor changes on effective valuation date to beta coefficients to determine Fair Value Adjustment appropriate for each market data input; and
3. Adjust initial market data inputs to reflect changes in current market conditions, and generate fair value evaluation for international fixed income security.

Example of Fair Value Adjustment Calculation for International Fixed Income Security The following example illustrates a fair value evaluation process for a hypothetical international fixed income security. In this example, the fixed income security is a Japanese Government Bond (JGB), paying an annual coupon rate of 0.3 JPY on a semi-annual basis, with an accrual basis of actual/365, with 1.5 years remaining until maturity, and no call or put features. At local market close time, the evaluation of JGB is 100.30, expressed as a percentage of par, and determined based on discounting future principal and interest to present value based on the corresponding Japanese government benchmark curve, using prevailing 6-month, 1-year, 1.5-year rates of 0.05%, 0.075%, and 0.10%, respectively. At the effective valuation time, using the fair value calculation methodology described herein, a Fair Value Adjustment Factor for each point on the underlying benchmark curve is generated by applying factor beta coefficients to factor changes. The Fair Value Adjustment factors are then applied to the benchmark curve points to generate a fair value adjusted benchmark curve. The future principal and interest cash flows are then discounted to present value using the fair value adjusted benchmark curve to generate a fair value adjusted evaluation for security JGB.

In this example, the positively adjusted benchmark curve points results in a downward fair value adjusted evaluation for security JGB. This makes sense since interest rate movements and fixed income security prices generally move in opposite directions.

TABLE 6

| Fair Value Adjusted Benchmark Curve | 6 M | 1 YR | 1.5 YR |
|---|---|---|---|
| Initial Benchmark Curve | .05 | .075 | .10 |
| Beta (Factor 1) | 0.50 | 0.60 | 0.85 |
| Beta (Factor 2) | −0.80 | −0.75 | −0.95 |
| Factor 1 change (11:30:00 to 15:45:30) | 2.00% | 2.00% | 2.00% |
| Factor 2 change (11:30:00 to 15:45:30) | −1.00% | −1.00 % | −1.00% |
| Fair Value Adjustment Factor per Point | 1.018 | 1.020 | 1.027 |
| Fair Value Adjusted Benchmark Curve | 0.051 | 0.0765 | 0.102 |
| Initial JGB Evaluation | 100.300 | | |
| Fair Value Adjusted JGB Evaluation | 100.295 | | |

Fair Value Adjusted Index Futures Contracts

For index futures contracts, an exemplary embodiment combines the adjustment factors for each of the constituent equities of the index, and based on their specific weightings, aggregates this information to create an Evaluated Adjustment Factor (EAF) for the futures contract. This EAF may be applied to the settlement price of the futures contract trading in its local market to reflect a fair value adjusted futures price.

Valuation Procedures: Futures

Based on the constituent and weightings information provided by the user, an exemplary embodiment:
4. Creates an Evaluated Adjustment Factor (EAF) for each constituent equity;
5. Multiplies the EAF by the daily percentage weighting for each constituent equity;
6. Sums the resulting [EAF*weighting] figures, to determine an aggregate Evaluated Adjustment Factor, which can be applied to the local market settlement price of the futures contract; and
7. Based on prevailing local market conditions the next day, one may recalibrate the constituent percentage weightings to reflect the current market values, and repeat steps 1-3.

Example of Fair Value Adjustment Calculation for International Index Futures Contract The following example illustrates a valuation process for a hypothetical international equity index futures contract. In this example, the underlying index is comprised of 10 constituent equities of varying weightings. At the effective valuation time, using the fair value calculation methodology described herein, a Fair Value Adjustment Factor for each of the underlying constituent equities is determined and multiplied by the constituent equity's weighting in the index. This provides for a specific adjustment to the portion of the index to which the constituent equity is contributing. From here, one may aggregate the constituent equity contributions through summation to arrive at an Evaluated Adjustment Factor (EAF), which may be applied to a local market settlement price of the international equity index futures contract. In this example, the EAF of 1.01267 indicates a positive fair value adjustment will take place when applied to the settlement price of the international equity index futures contract at the effective valuation time.

TABLE 7

| Constituent Equities (Cn) | Constituent Equity Weighting in Index | Constituent Equity FVIS Adjustment Factor | Constituent Equity Weighting * FVIS Adjustment Factor |
|---|---|---|---|
| C1 | 9.4% | 1.005 | 0.09447 |
| C2 | 5.1% | 1.01 | 0.05151 |
| C3 | 15.6% | 1.023 | 0.159588 |
| C4 | 0.9% | 1.001 | 0.009009 |
| C5 | 8.2% | 0.995 | 0.08159 |
| C6 | 17.2% | 1.01 | 0.17372 |
| C7 | 3.2% | 1.04 | 0.03328 |
| C8 | 14.9% | 0.99 | 0.14751 |
| C9 | 2.0% | 0.995 | 0.0199 |
| C10 | 23.5% | 1.03 | 0.24205 |
| | | EAF = | 1.012627 |

For example:

Local market settlement price for international equity index futures contract=GBP 1000

Settlement price*EAF=GBP 1000*1.01267=GBP 1012.67=Fair Value Adjusted Futures Price Fair Value Adjusted International Equity Options For European-style, exchange listed or over-the-counter, international options, an exemplary embodiment uses a closing options price to calculate an implied volatility, which in combination with the fair value calculation methodology described herein for the underlying equity, is used to calculate the Fair Value evaluated price for the option.

Valuation Procedures: Options
Step 1: Calculation of the Implied Volatility: an exemplary embodiment uses the option's type, strike price, price, time to expiration, risk-free rate, and underlying stock price to calculate the implied volatility utilizing the Black-Scholes-Merton (BSM) option pricing model.
Step 2: Calculation of the Fair Value Evaluated Option Price: An exemplary embodiment then recalibrates the BSM model using the option's type, strike price, time to expiration, risk-free rate, the implied volatility (as calculated above), and the underlying equity's fair value evaluated price to determine a fair value evaluated option price.

Example of Fair Value Evaluated Option Price Calculation for an International Equity Option The following example illustrates an exemplary valuation process for a hypothetical international equity option. As described above, Step 1 starts with descriptive characteristics and market pricing information as of local market close time, and plugs this information into the BSM option pricing model to determine the implied volatility priced into the option's value by market participants. Based on this example, one may estimate a market price implied volatility of 21.45%.

Step 1: Import below inputs into BSM option pricing model to calculate the market implied volatility:

TABLE 8

| Underlying Equity Price | $10.00 |
|---|---|
| Option Type (C/P) | C |
| Time to Expiration (T/365) | 0.334 |
| Strike Price | $10.00 |
| Option Price (as of local market close time) | $0.50 |
| Risk-Free Rate | 0.35 |
| Solve for Implied Volatility | 0.2145 |

TABLE 8-continued

Step 2 is a second process that runs at effective valuation time (following the close time in the local market) at a point when the Fair Value adjusted international equity price is determined. Once again using the BSM option pricing model, one can now replace the underlying equity price with the updated Fair Value adjusted international equity price, as well as incorporate the market implied volatility for the option that was determined in Step 1. At this point, one may utilize the BSM option pricing model to solve for the option price. This option price is now reflective of current market information expected to influence the underlying equity price, and is determined to represent the Fair Value Adjusted Option Price.

Step 2: Import below inputs into BSM option pricing model to calculate the Fair Value Adjusted Option Price:

TABLE 9

| | |
|---|---|
| FVIS Evaluation of Underlying Equity (substitute for original equity price) | $10.10 |
| Option Type (C/P) | C |
| Time to Expiration (T/365) | 0.1756 |
| Strike Price | $10.00 |
| Risk-Free Rate | 0.35 |
| Implied Volatility (determined from Step 1) | 0.2145 |
| Solve for Fair Value Adjusted Option Price | $0.55 |

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified herein could be the same processor. All such combinations are within the scope of the invention.

Alternatively, or in combination, processing and decision-making may be performed by functionally equivalent circuits such as a digital signal processor circuit or an application specific integrated circuit (ASIC). Many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated, the processes described herein are unordered—that is, the processes can be performed in any reasonable order. Also, those skilled in the art will understand that the back-testing described herein may be performed either in-sample or out-of-sample (or a combination thereof) without departing from the scope of the invention.

All steps described herein will be understood by those skilled in the art as being capable of implementation by software, where feasible. Moreover, such software will be understood by those skilled in the art to be storable on a non-transitory computer readable medium and implementable by one or more computer processors.

We claim:

1. A computerized method for determining at an effective valuation time a fair value of an exchange traded fund comprising a plurality of securities, each of said plurality of securities having a weighting in said exchange traded fund, comprising:

for each security in said exchange traded fund:
electronically receiving historical price data, wherein said historical price data comprises data for a plurality of price-related time-dependent variables;
electronically performing a regression analysis on said historical price data; and
electronically calculating at said effective valuation time a fair value of said security based on said regression analysis and on values of one or more of said plurality of price-related time-dependent variables;
electronically multiplying said fair value by said security's weighting in said exchange traded fund to obtain a weighted fair value; and aggregating said weighted fair values of each of said plurality of securities in said exchange traded fund to obtain a fair value adjusted price for said exchange traded fund at a time when at least one security in said exchange traded fund is not currently traded in a liquid market, wherein the steps of electronically receiving, performing, calculating, and multiplying are processed on a computer system.

2. A computerized method for determining at an effective valuation time a fair value of a futures contract based on an equity index comprising a plurality of securities, each of said plurality of securities having a weighting in said equity index, comprising:

for each security in said equity index:
electronically receiving historical price data, wherein said historical price data comprises data for a plurality of price-related time-dependent variables;
electronically performing a regression analysis on said historical price data;
electronically calculating at said effective valuation time a fair value of said security based on said regression analysis and on values of one or more of said plurality of price-related time-dependent variables;
electronically multiplying said fair value by said security's weighting in said equity index to obtain a weighted fair value;

aggregating said weighted fair values of each of said plurality of securities in said equity index to obtain an adjustment factor for said equity index; and applying said adjustment factor to a market settlement price of said futures contract at a time when at least one security in said equity index is not currently traded in a liquid market, wherein the steps of electronically receiving, performing, calculating, and multiplying are processed on a computer system.

3. A computerized method for determining at an effective valuation time a fair value of an option based on a security, comprising:

electronically receiving historical price data for said security, wherein said historical price data comprises data for a plurality of price-related time-dependent variables;
electronically performing a regression analysis on said historical price data;
electronically calculating at said effective valuation time a fair value of said security based on said regression analysis and on values of one or more of said plurality of price-related time-dependent variables;

electronically calculating an implied volatility for said option; and calculating a price for said option based on said implied volatility and said fair value of said security at a time when said security is not currently traded on a liquid market, wherein the steps of electronically receiving, performing, and calculating are processed on a computer system.

4. A computerized method for determining at an effective valuation time a fair value of a market-traded fixed income security, comprising:

receiving historical price data, wherein said historical price data comprises data for a plurality of price-related time-dependent variables;

performing a regression analysis on said historical price data; and calculating at said effective valuation time a fair value of said market-traded fixed income security based on said regression analysis and on values of one or more of said plurality of price-related time-dependent variables, said effective valuation time occurring when said market-traded fixed income security is not currently trading in a liquid market;

wherein the steps of electronically receiving, performing, and calculating are processed on a computer system comprising one or more processors.

5. A method as in claim 1, wherein said exchange traded fund comprises one or more securities traded on one or more markets outside the United States.

6. A method as in claim 5, wherein for each security in said exchange traded fund, said fair value at said effective valuation time is calculated based further on a currency exchange rate.

7. A method as in claim 5, wherein for each security in said exchange traded fund, said fair value at said effective valuation time is calculated based further on one or more beta coefficients.

8. A method as in claim 5, wherein for each security in said exchange traded fund, said fair value at said effective valuation time is calculated every second following local market close time.

9. A method as in claim 4, wherein said historical price data comprises data regarding one or more of: coupon rate, payment frequency, maturity date, issue features, rating category, industrial sector, and issuer.

10. A method as in claim 4, wherein said historical price data comprises data inputs for a market on which said fixed income security is traded, said market data inputs comprising one or more of: historical trade data, historical valuation data, benchmark curves, volatilities, and credit spreads.

11. A method as in claim 4, wherein said regression analysis comprises regression of correlative factors to market data inputs to determine beta coefficients.

12. A method as in claim 11, wherein said calculating at said effective valuation time a fair value of said market-traded fixed income security comprises multiplying factor changes to beta coefficients to determine an adjustment for each market data input.

13. A method as in claim 2, wherein said calculating at said effective valuation time a fair value for each security in said equity index comprises calculating an evaluation adjustment factor for said security.

14. A method as in claim 13, wherein said calculating at said effective valuation time a fair value for each security in said equity index comprises multiplying said evaluated adjustment factor by a daily percentage weighting for said security.

15. A method as in claim 3, wherein said option is a European-style option.

16. A method as in claim 3, wherein said option is an exchange-listed or over-the-counter (OTC) option.

17. A method as in claim 3, wherein said implied volatility is calculated based on one or more of: option type, strike price, option price, time to expiration, risk-free rate, and underlying stock price, using an option pricing model.

* * * * *